(12) United States Patent
Nakagawa et al.

(10) Patent No.: US 9,746,303 B2
(45) Date of Patent: Aug. 29, 2017

(54) COORDINATE MEASURING MACHINE AND METHOD FOR CALCULATING CORRECTION MATRIX BY COORDINATE MEASURING MACHINE

(71) Applicant: MITUTOYO CORPORATION, Kanagawa (JP)

(72) Inventors: Hideyuki Nakagawa, Ibaraki (JP); Nobuhiro Ishikawa, Ibaraki (JP)

(73) Assignee: MITUTOYO CORPORATION, Kanagawa (JP)

( * ) Notice: Subject to any disclaimer, the term of this patent is extended or adjusted under 35 U.S.C. 154(b) by 407 days.

(21) Appl. No.: 14/621,926

(22) Filed: Feb. 13, 2015

(65) Prior Publication Data

US 2015/0241194 A1 Aug. 27, 2015

(30) Foreign Application Priority Data

Feb. 21, 2014 (JP) ................................. 2014-032300

(51) Int. Cl.
*G01B 5/012* (2006.01)
*G01B 5/008* (2006.01)
*G01B 21/04* (2006.01)

(52) U.S. Cl.
CPC ........... *G01B 5/008* (2013.01); *G01B 21/042* (2013.01); *G01B 21/045* (2013.01)

(58) Field of Classification Search
CPC .... G01B 21/045; G01B 21/042; G01B 5/008; G01B 11/005
See application file for complete search history.

(56) References Cited

U.S. PATENT DOCUMENTS 6,591,208 B2 * 7/2003 Lotze .................... G01B 21/045
   702/152
7,269,473 B2 * 9/2007 Otsuki ................. G01B 21/042
   700/193
(Continued)

FOREIGN PATENT DOCUMENTS

EP   1536205       6/2005
JP   2628523 B2    7/1997
(Continued)

OTHER PUBLICATIONS

Search Report issued by E.P.O. in EP Patent Application No. 15155404.5, dated Jul. 3, 2015.

*Primary Examiner* — Jaehwan Oh
(74) *Attorney, Agent, or Firm* — Greenblum & Bernstein, P.L.C.

(57) ABSTRACT

A first correction component calculation processing unit calculates diagonal components of a correction matrix based on first and second detection values. The first and second detection values are obtained by measurement in which a calibration reference body and the probe are moved relatively to each other in a normal direction on a surface of the calibration reference body so as to bring a measurement tip into contact with the surface of the calibration reference body at one point. A second correction component calculation processing unit calculates non-diagonal components of the correction matrix based on third and fourth detection values. The third and fourth detection values are obtained by scanning measurement using the measurement tip on the surface of the calibration reference body while maintaining a constant relative distance between the center of the measurement tip and a reference point or a reference line of the calibration reference body.

8 Claims, 7 Drawing Sheets

(56) References Cited

U.S. PATENT DOCUMENTS

| | | | | |
|---|---|---|---|---|
| 7,668,678 | B2* | 2/2010 | Scott | G01B 21/042 |
| | | | | 702/94 |
| 9,366,522 | B2* | 6/2016 | Noda | G01B 5/20 |
| 2002/0148275 | A1* | 10/2002 | Abbe | G01B 21/042 |
| | | | | 73/1.01 |
| 2004/0244464 | A1* | 12/2004 | Hajdukiewicz | G01B 21/042 |
| | | | | 73/1.79 |
| 2005/0111725 | A1 | 5/2005 | Noda et al. | |
| 2009/0307915 | A1* | 12/2009 | Sutherland | G01B 21/042 |
| | | | | 33/502 |
| 2011/0054835 | A1* | 3/2011 | Takamasu | G01B 5/008 |
| | | | | 702/150 |
| 2011/0191060 | A1* | 8/2011 | Lotze | G01B 21/042 |
| | | | | 702/150 |
| 2013/0253871 | A1* | 9/2013 | Gray | B23Q 17/22 |
| | | | | 702/95 |
| 2014/0059872 | A1* | 3/2014 | Nakagawa | G01B 21/045 |
| | | | | 33/502 |
| 2014/0130362 | A1* | 5/2014 | Ishikawa | G01B 21/045 |
| | | | | 33/503 |

FOREIGN PATENT DOCUMENTS

| | | |
|---|---|---|
| JP | 2005-507495 | 3/2005 |
| JP | 2009-534681 | 9/2009 |
| JP | 2013-15464 | 1/2013 |

* cited by examiner

COORDINATE MEASURING MACHINE AND METHOD FOR CALCULATING CORRECTION MATRIX BY COORDINATE MEASURING MACHINE

INCORPORATION BY REFERENCE

This application is based upon and claims the benefit of priority from Japanese patent application No. 2014-032300, filed on Feb. 21, 2014, the disclosure of which is incorporated herein in its entirety by reference.

BACKGROUND OF THE INVENTION

1. Field of the Invention

The present invention relates to a coordinate measuring machine that performs a scanning measurement using a probe including a contact-type measurement tip, and a method for calculating a correction matrix by a coordinate measuring machine.

2. Description of Related Art

A coordinate measuring machine is generally used in combination with a probe. If the coordinate system on the main body side of the coordinate measuring machine matches the coordinate system of the probe, the drive detection value $\{x_m, y_m, z_m\}^T$ of the coordinate measuring machine, which is represented by the coordinate system on the main body side of the coordinate measuring machine, and the probe detection value $\{x_p, y_p, z_p\}^T$, which is represented by the coordinate system of the probe, are added, to thereby calculate the measurement result $\{x, y, z\}^T$ as shown in the following Expression (1).

$$\begin{Bmatrix} x \\ y \\ z \end{Bmatrix} = \begin{Bmatrix} x_m \\ y_m \\ z_m \end{Bmatrix} + \begin{Bmatrix} x_p \\ y_p \\ z_p \end{Bmatrix} \quad (1)$$

On the other hand, if the coordinate system on the main body side of the coordinate measuring machine does not match the coordinate system of the probe, an error occurs. The occurrence of the error due to the mismatch between the coordinate systems can be reduced by coordinate conversion using a correction matrix as shown in Expression (2), and various methods for calculating the correction matrix have been proposed.

$$\begin{Bmatrix} x_{p\_m} \\ y_{p\_m} \\ z_{p\_m} \end{Bmatrix} = \begin{bmatrix} A_{11} & A_{12} & A_{13} \\ A_{21} & A_{22} & A_{23} \\ A_{31} & A_{32} & A_{33} \end{bmatrix} \begin{Bmatrix} x_p \\ y_p \\ z_p \end{Bmatrix} \quad (2)$$

where $$\begin{bmatrix} A_{11} & A_{12} & A_{13} \\ A_{21} & A_{22} & A_{23} \\ A_{31} & A_{32} & A_{33} \end{bmatrix} : \text{CORRECTION MATRIX} \quad (2')$$

$\{x_{p\_m}, y_{p\_m}, z_{p\_m}\}^T$: the probe detection value obtained by converting the coordinate system of the probe into the coordinate system on the main body side of the coordinate measuring machine.

The measurement result $\{x, y, z\}^T$ which is obtained by taking into consideration an error is expressed by the following Expression (3).

$$\begin{Bmatrix} x \\ y \\ z \end{Bmatrix} = \begin{Bmatrix} x_m \\ y_m \\ z_m \end{Bmatrix} + \begin{Bmatrix} x_{p\_m} \\ y_{p\_m} \\ z_{p\_m} \end{Bmatrix} \quad (3)$$

In this regard, Published Japanese Translation of PCT International Publication for Patent Application, No. 2009-534681 proposes a method for performing a scanning measurement of a reference sphere with a first push-in amount, further performing a scanning measurement of the reference sphere with a second push-in amount, and calculating the correction matrix by using detection values obtained as a result of the measurements.

Published Japanese Translation of PCT International Publication for Patent Application, No. 2005-507495 proposes a method for performing a scanning measurement of a reference sphere while continuously changing a push-in amount on a movement path parallel to a chord of the reference sphere or on a sinusoidal path, and for calculating the correction matrix by using detection values obtained as a result of the measurement.

SUMMARY OF THE INVENTION

However, the coordinate measuring machine of the related art disclosed in Published Japanese Translation of PCT International Publication for Patent Application, No. 2009-534681 is required to perform the scanning measurement twice, which results in an increase in measurement time.

Further, in the coordinate measuring machine of the related art disclosed in Published Japanese Translation of PCT International Publication for Patent Application, No. 2005-507495, the tip sphere of the probe moves along the movement path parallel to the chord of the reference sphere and both the push-in amount and the measurement direction of a stylus change during the measurement using the reference sphere. Accordingly, it is difficult to separate the effect of a change in the push-in amount on the measurement error from the effect of a change in the measurement direction on the measurement error. In other words, the invention disclosed in Published Japanese Translation of PCT International Publication for Patent Application, No. 2005-507495 has a problem that the method for accurately calculating the probe correction matrix is complicated. Further, in the case of a sinusoidal path, the length of the movement path increases, which results in an increase in measurement time.

It is an object of the present invention to provide a coordinate measuring machine and a method for calculating a correction matrix by a coordinate measuring machine, which are capable of facilitating calculation of a correction matrix to correct a probe detection value and reducing a calculation time.

A first exemplary aspect of the present invention is a coordinate measuring machine including: a probe that includes a stylus having a measurement tip disposed at a distal end thereof and is configured to perform measurement by bringing the measurement tip into contact with an object to be measured; a measurement tip displacement detection unit that is disposed at a proximal end of the stylus of the probe and detects a displacement of the measurement tip; a drive unit that moves the probe in a predetermined direction; a scale unit that detects an amount of movement of the probe when the probe is moved by the drive unit; and a correction matrix calculation unit that calculates a correction matrix to correct a detection value output from the measurement tip displacement detection unit of the probe. The correction matrix calculation unit includes: a first correction component calculation processing unit that calculates diagonal components of the correction matrix based on a first detection value output from the measurement tip displacement detection unit of the probe and a second detection value output from the scale unit, the first detection value and the second detection value being obtained by a measurement in which a calibration reference body and the probe are moved relatively to each other in a normal direction on a surface of the calibration reference body so as to bring the measurement tip of the probe into contact with the surface of the calibration reference body at one point from the normal direction; and a second correction component calculation processing unit that calculates non-diagonal components of the correction matrix based on a third detection value output from the measurement tip displacement detection unit of the probe and a fourth detection value output from the scale unit, the third detection value and the fourth detection value being obtained by a scanning measurement using the measurement tip on the surface of the calibration reference body while maintaining a constant relative distance between the center of the measurement tip of the probe and a reference point or a reference line of the calibration reference body.

In the coordinate measuring machine according to the first exemplary aspect of the present invention, the diagonal components and the non-diagonal components are individually calculated by suitable calculation methods after the detection values necessary for calculation of the correction matrix are effectively obtained. This facilitates the calculation of the correction matrix, reduces the calculation time, and makes it possible to accurately calculate the probe correction matrix.

Further, in the first correction component calculation processing unit, after the measurement tip of the probe is moved in the normal direction from a position proximate to the calibration reference body, the movement of the probe is reversed to move the measurement tip in the normal direction until the measurement tip is separated from the calibration reference body, and the first detection value output from the measurement tip displacement detection unit of the probe and the second detection value output from the scale unit are obtained during a period between a time when the measurement tip is brought into contact with the calibration reference body and a time when the measurement tip is separated from the calibration reference body.

Furthermore, the calibration reference body and the probe are moved relatively to each other in the normal direction so as to bring the measurement tip into contact with the surface of the calibration reference body at one point from the normal direction in a state in which the measurement tip is controlled to be displaceable only in one axis direction of a three-axis coordinate system.

A second exemplary aspect of the present invention is a method for calculating correction matrix by a coordinate measuring machine, the coordinate measuring machine including: a scale unit that detects an amount of movement of a probe when the probe is moved by a drive unit that moves the probe in a predetermined direction, the probe including a measurement tip displacement detection unit that detects a displacement of the measurement tip that is disposed at a stylus of the probe and is brought into contact with an object to be measured; and a correction matrix calculation unit that calculates a correction matrix to correct a detection value output from the measurement tip displacement detection unit of the probe, the method including: a one-point contact measurement step of actually measuring and obtaining a first detection value output from the measurement tip displacement detection unit of the probe and a second detection value output from the scale unit, by moving a calibration reference body and the probe relatively to each other in a normal direction on a surface of the calibration reference body so as to bring the measurement tip into contact with the surface of the calibration reference body at one point from the normal direction; a first correction matrix calculation step of calculating diagonal components of the correction matrix based on the first detection value and the second detection value obtained in the one-point contact measurement step; a scanning measurement step of actually measuring and obtaining a third detection value output from the measurement tip displacement detection unit of the probe and a fourth detection value output from the scale unit, by a scanning measurement using the measurement tip on the surface of the calibration reference body while maintaining a constant relative distance between the center of the measurement tip of the probe and a reference point or a reference line of the calibration reference body; and a second correction matrix calculation step of calculating non-diagonal components of the correction matrix based on the third detection value and the fourth detection value obtained in the scanning measurement step.

In the method for calculating a correction matrix by a coordinate measuring machine according to the second exemplary aspect of the present invention, the diagonal components and the non-diagonal components are individually calculated by suitable calculation methods after the detection values necessary for calculation of the correction matrix are effectively obtained. This facilitates the calculation of the correction matrix, reduces the calculation time, and makes it possible to accurately calculate the probe correction matrix.

Further, in the one-point contact measurement step, after the measurement tip of the probe is moved in the normal direction from a position proximate to the calibration reference body until the detection value output from the measurement tip displacement detection unit of the probe reaches a predetermined value, the movement of the probe is reversed to move the measurement tip in the normal direction until the measurement tip is separated from the calibration reference body, and the first detection value output from the measurement tip displacement detection unit of the probe and the second detection value output from the scale unit are obtained during a period between a time when the measurement tip is brought into contact with the calibration reference body and a time when the measurement tip is separated from the calibration reference body.

Furthermore, in the one-point contact measurement step, the calibration reference body and the probe are moved relatively to each other in the normal direction so as to bring the measurement tip into contact with the surface of the calibration reference body at one point from the normal direction in a state in which the measurement tip is controlled to be displaceable only in one axis direction of a three-axis coordinate system.

According to the present invention, it is possible to facilitate the calculation of the correction matrix to correct the detection value output from the measurement tip displacement detection unit of the probe and to reduce the calculation time.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Hereinafter, preferred exemplary embodiments of a coordinate measuring machine and a method for calculating a correction matrix by a coordinate measuring machine according to the present invention will be described in detail with reference to the drawings.

[Schematic Configuration of Coordinate Measuring Machine 1]

Figure 1:
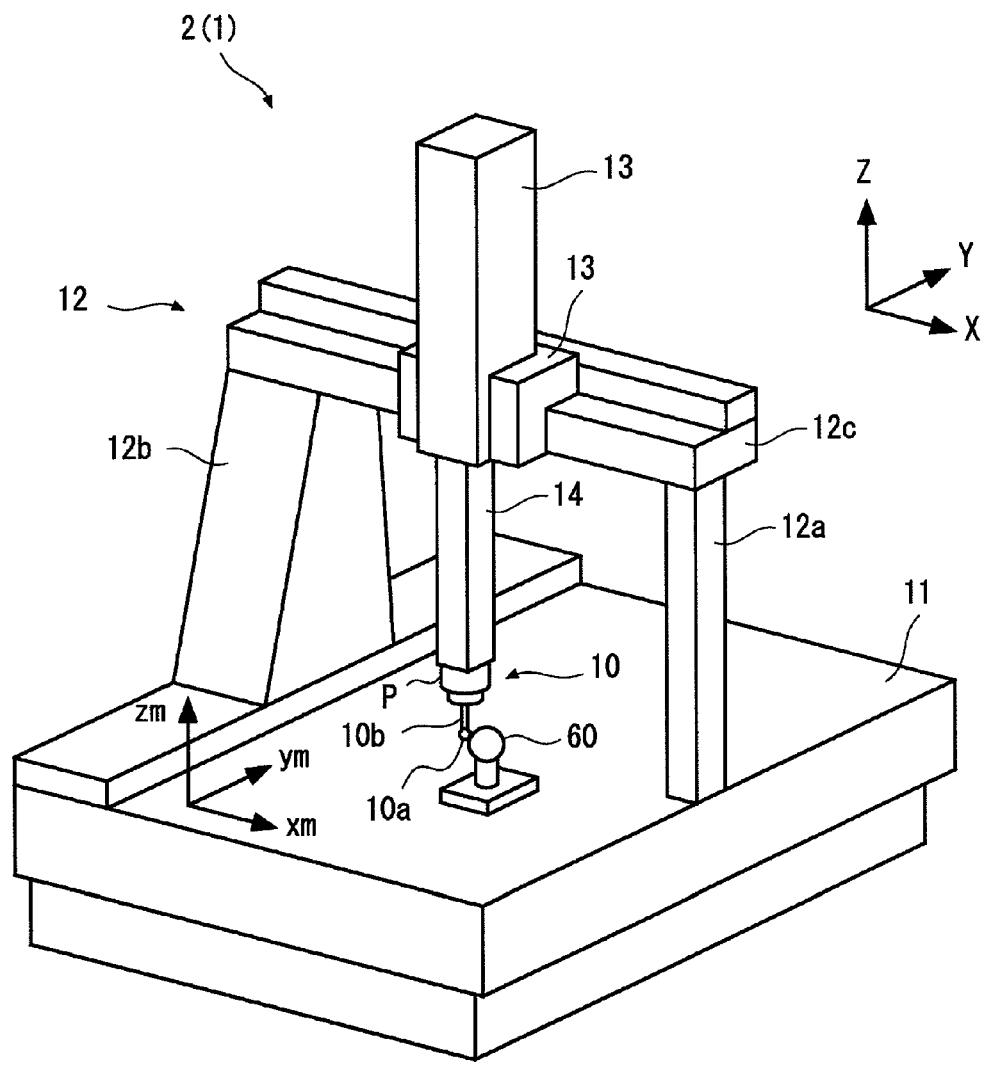
FIG. 1 is a perspective view showing a coordinate measuring machine according to an exemplary embodiment of the present invention.
Figure 2:
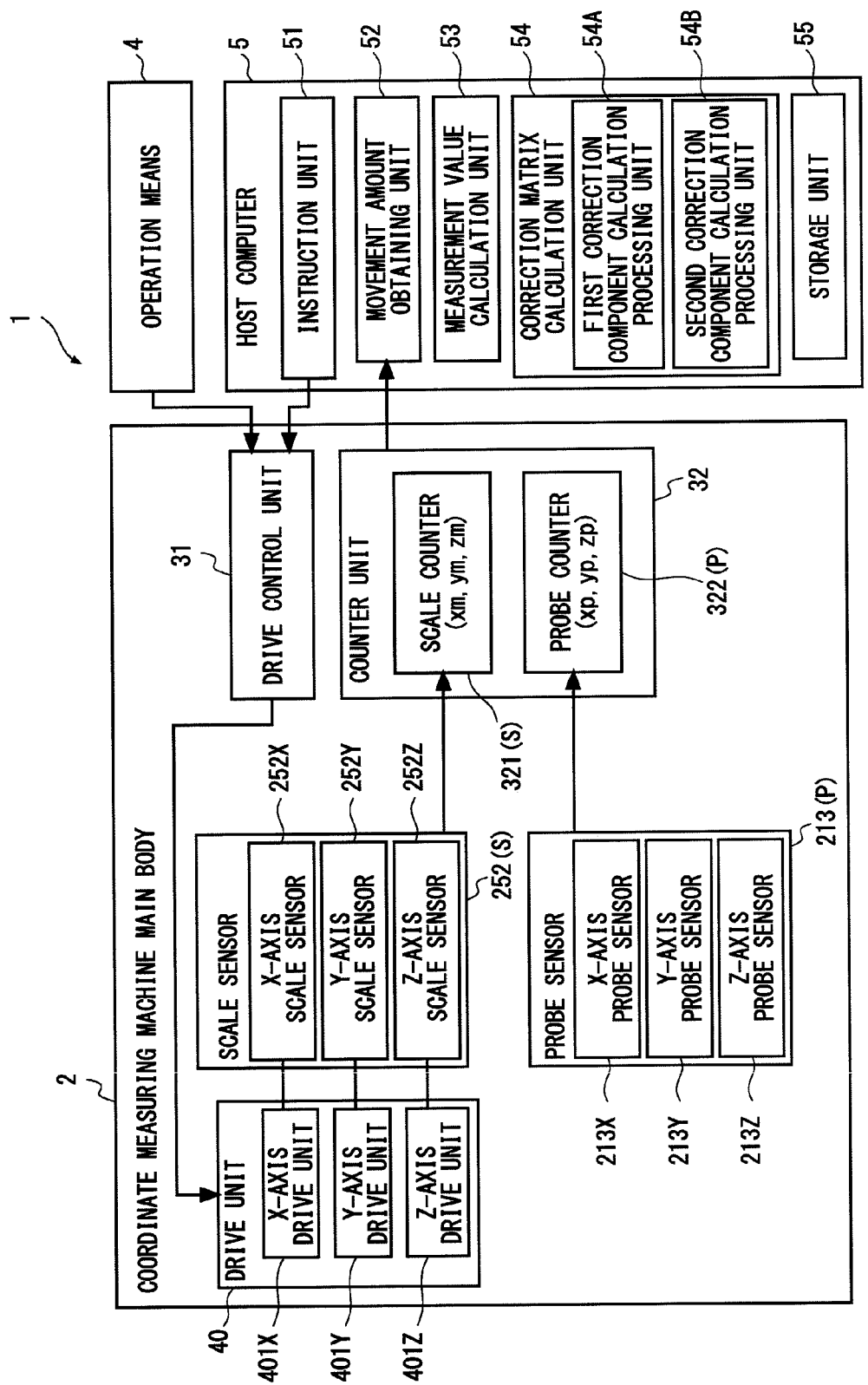
FIG. 2 is a block diagram schematically showing the coordinate measuring machine according to an exemplary embodiment of the present invention.

As shown in FIGS. 1 and 2, a coordinate measuring machine 1 includes a coordinate measuring machine main body 2, operation means 4, and a host computer 5. The coordinate measuring machine main body 2 includes various driving mechanisms that measure an object to be measured, and a drive control unit 31 that controls driving of these mechanisms. The operation means 4 manually operates the coordinate measuring machine main body 2 by an operating lever. The host computer 5 provides the coordinate measuring machine main body 2 with predetermined instructions and executes arithmetic processing.

[Configuration of Coordinate Measuring Machine Main Body 2]

As shown in FIG. 1, the coordinate measuring machine main body 2 includes a probe 10 that measures the object to be measured. The probe 10 includes a stylus 10b and a measurement tip displacement detection unit P. The stylus 10b has a spherical measurement tip 10a disposed at a distal end thereof. The measurement tip displacement detection unit P detects a movement (displacement) of the measurement tip 10a at a proximal end of the stylus 10b. The measurement tip displacement detection unit P of the probe 10 can be moved in a three-dimensional direction by a drive unit 40 (see FIG. 2) of the coordinate measuring machine main body 2.

The coordinate measuring machine main body 2 includes a gate-shaped support frame 12 which is movable in the Y-axis direction on a surface plate 11 that is placed on a floor or the like. The support frame 12 includes a pair of posts 12a and 12b which are movable in the Y-axis direction on the surface plate 11, and a beam 12c extending in the horizontal direction so as to bridge the space between the posts 12a and 12b. A column 13 is moved in the X-axis direction along the beam 12c. The column 13 is mounted with a slider 14 that moves up and down in the vertical direction (Z-axis direction). The measurement tip displacement detection unit P of the probe 10 is fixed to a lower end of the slider 14.

As shown in FIGS. 1 and 2, the coordinate measuring machine main body 2 incorporates the drive unit 40 that moves the probe 10 in the X-axis direction, the Y-axis direction, and the Z-axis direction. The drive unit 40 includes an X-axis drive unit 401X, a Y-axis drive unit 401Y, and a Z-axis drive unit 401Z. The X-axis drive unit 401X includes an X-axis driving mechanism extending in the X-axis direction along the beam 12c. The Y-axis drive unit 401Y includes a Y-axis driving mechanism extending in the Y-axis direction along one side of the surface plate 11. The Z-axis drive unit 401Z includes a Z-axis driving mechanism extending in the Z-axis direction along the direction in which the column 13 extends.

Further, in the coordinate measuring machine main body 2, a scale sensor 252 that detects the positions in each axis direction of the column 13, the support frame 12, and the slider 14 is divided into an X-axis scale sensor 252X, a Y-axis scale sensor 252Y, and a Z-axis scale sensor 252Z. The scale sensor 252 is a position sensor that outputs pulse signals according to the amount of movement of each of the column 13, the support frame 12, and the slider 14.

A probe sensor 213 of the probe 10 is divided into an X-axis probe sensor 213X, a Y-axis probe sensor 213Y, and a Z-axis probe sensor 213Z, each of which detects a displacement in the corresponding axis direction of the measurement tip 10a. As with each scale sensor 252, each probe sensor 213 is a position sensor that outputs pulse signals according to the amount of movement in each axis direction of the stylus 10b.

Further, the coordinate measuring machine main body 2 includes the drive control unit 31 and a counter unit 32. The drive control unit 31 controls the drive unit 40 according to the instructions from the operation means 4 or the host computer 5. The counter unit 32 counts the number of pulse signals output from the scale sensor 252 and the probe sensor 213. The counter unit 32 includes a scale counter 321 and a probe counter 322. The scale counter 321 counts the number of pulse signals output from each scale sensor 252 and measures the amount of movement. The probe counter 322 counts the number of pulse signals output from each probe sensor 213, and measures the amount of movement of the measurement tip 10a. The values detected by the scale counter 321 and the probe counter 322 are output to the host computer 5.

Based on the above-described configuration, a scale unit S includes the scale sensor 252 and the scale counter 321, and the measurement tip displacement detection unit P includes the probe sensor 213 and the probe counter 322.

[Configuration of Host Computer 5]

The host computer 5 includes a CPU (Central Processing Unit), a memory, and the like, and controls the coordinate measuring machine main body 2 by providing the drive control unit 31 with predetermined instructions. The host computer 5 includes an instruction unit 51, a movement amount obtaining unit 52, a measurement value calculation unit 53, a correction matrix calculation unit 54, and a storage unit 55 that stores data to be used by the host computer 5.

The instruction unit 51 provides the drive control unit 31 with predetermined instructions, and actuates the drive unit 40 of the coordinate measuring machine main body 2. Specifically, the instruction unit 51 outputs a position instruction value for the drive unit 40 to move the measurement tip 10a based on outline CAD data on the object to be measured. The outline CAD data on the object to be measured is stored in the storage unit 55.

The movement amount obtaining unit 52 obtains the amount of movement (xp, yp, zp) of the measurement tip 10a and the amount of movement (xm, ym, zm) of the drive unit 40 which are measured by the counter unit 32. In this case, the movement amount obtaining unit 52 obtains the amount of movement of the measurement tip 10a based on the Cartesian coordinate system defined in the probe 10, and obtains the amount of movement of the drive unit 40 based on the Cartesian coordinate system defined in the drive unit 40.

The measurement value calculation unit 53 calculates the position of the measurement tip 10a based on the amount of movement of measurement tip 10a and the amount of movement of the drive unit 40 which are obtained by the movement amount obtaining unit 52. The amount of movement of the drive unit 40 is adjusted so as to indicate the position of the measurement tip 10 when the measurement tip 10a is not moved at all, i.e., when the amount of movement of the measurement tip 10a is 0.

In the coordinate measuring machine 1, if the coordinate system related to the movement measurement on the drive unit 40 side does not match the coordinate system related to the movement measurement on the measurement tip 10a side, a measurement error occurs. For this reason, it is necessary to correct such an error in advance before a regular measurement of an object to be measured.

At the start of the measurement, a reference sphere 60 serving as a calibration reference body is set at a predetermined position on the surface plate 11. The measurement sphere 10a made of ruby is used as the measurement tip.

Figure 3:
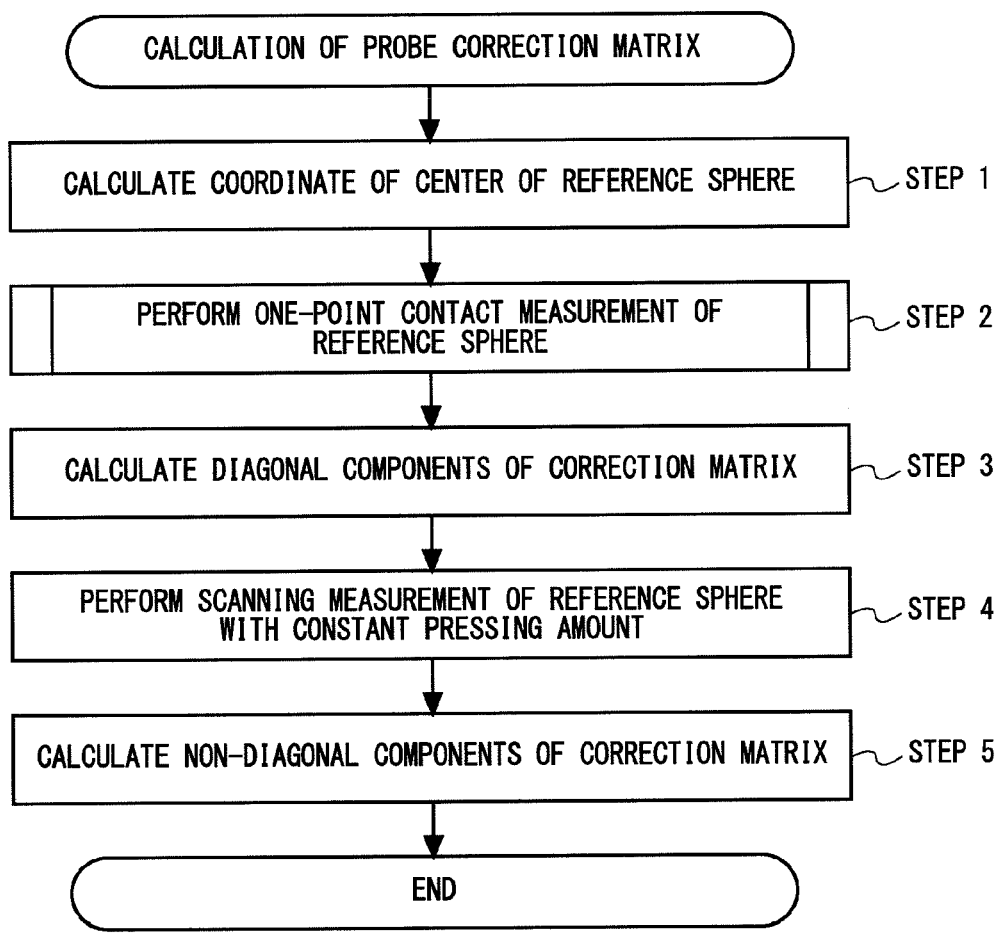
FIG. 3 is a flowchart showing calculation of a correction matrix for a probe.

As shown in FIG. 3, the coordinate of the center of the reference sphere 60 is obtained by a touch measurement in which the measurement sphere 10a is in slight contact with the reference sphere 60 (step 1). The measurement to be performed in the state where the measurement sphere 10a is in point contact with the reference sphere 60 at one point (hereinafter referred to as "one-point contact measurement") is executed in each of the X-axis direction, the Y-axis direction, and the Z-axis direction (step 2). The one-point contact measurement on the X-axis is hereinafter referred to as "step 2x". The one-point contact measurement on the Y-axis is hereinafter referred to as "step 2y". The one-point contact measurement on the Z-axis is hereinafter referred to as "step 2z".

Diagonal components $A_{11}$, $A_{22}$, and $A_{33}$ of the correction matrix (see the above Expression (2')) are calculated (step 3) based on a detection value detected by the probe 10, i.e., a first detection value output from the measurement tip displacement detection unit P, and a detection value detected by the drive unit 40, i.e., a second detection value output from the scale unit S, which are obtained in step 2 in the coordinate measuring machine 1. A specific method for calculating the diagonal components of the correction matrix is described later.

Next, the measurement sphere 10a is pressed against the reference sphere 60, and a scanning measurement is performed using the measurement sphere 10a on the surface of the reference sphere 60 while maintaining a constant push-in amount of the measurement sphere 10a (step 4). Non-diagonal components $A_{12}$, $A_{13}$, $A_{21}$, $A_{23}$, $A_{31}$, and $A_{32}$ of the correction matrix are calculated (step 5) based on a detection value detected by the probe 10, i.e., a third detection value output from the measurement tip displacement detection unit P, and a detection value detected by the drive unit 40, i.e., a fourth detection value output from the scale unit S, which are obtained in step 4 in the coordinate measuring machine 1. A specific method for calculating the non-diagonal components of the correction matrix is described later.

A specific method for calculating the diagonal components of the correction matrix, or the details of step 2, will be described by taking the one-point contact measurement in the X-axis direction (step 2x) as an example.

Figure 5:
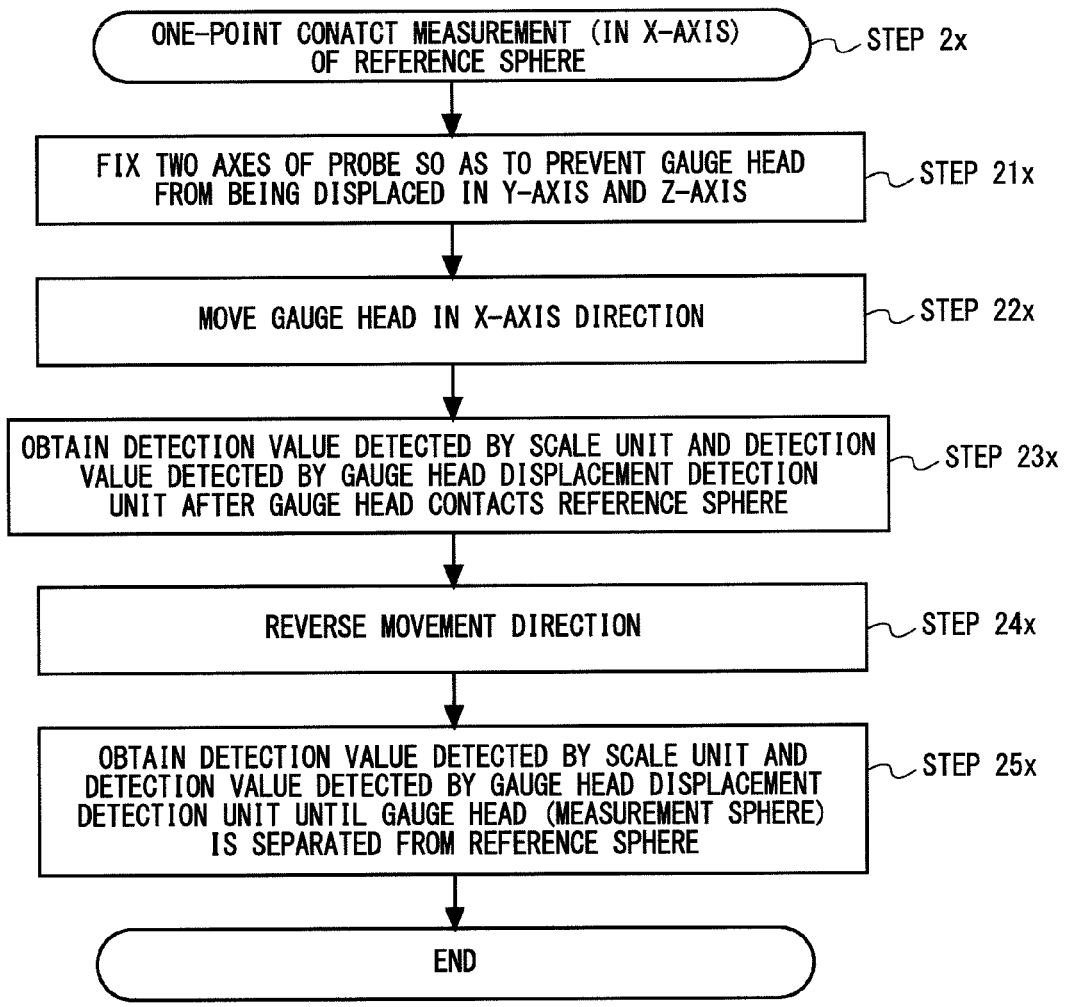
FIG. 5 is a flowchart showing one-point contact measurement in the X-axis direction.

To prevent the measurement sphere 10a of the probe 10 from being displaced in the Y-axis direction and the Z-axis direction, the two axes of the probe 10 are fixed (step 21x) as shown in FIG. 5. A configuration for regulating the measurement sphere 10a in such a manner that the measurement sphere 10a moves only in one axis direction is known as disclosed in, for example, Japanese Patent No. 2628523.

Figure 6:
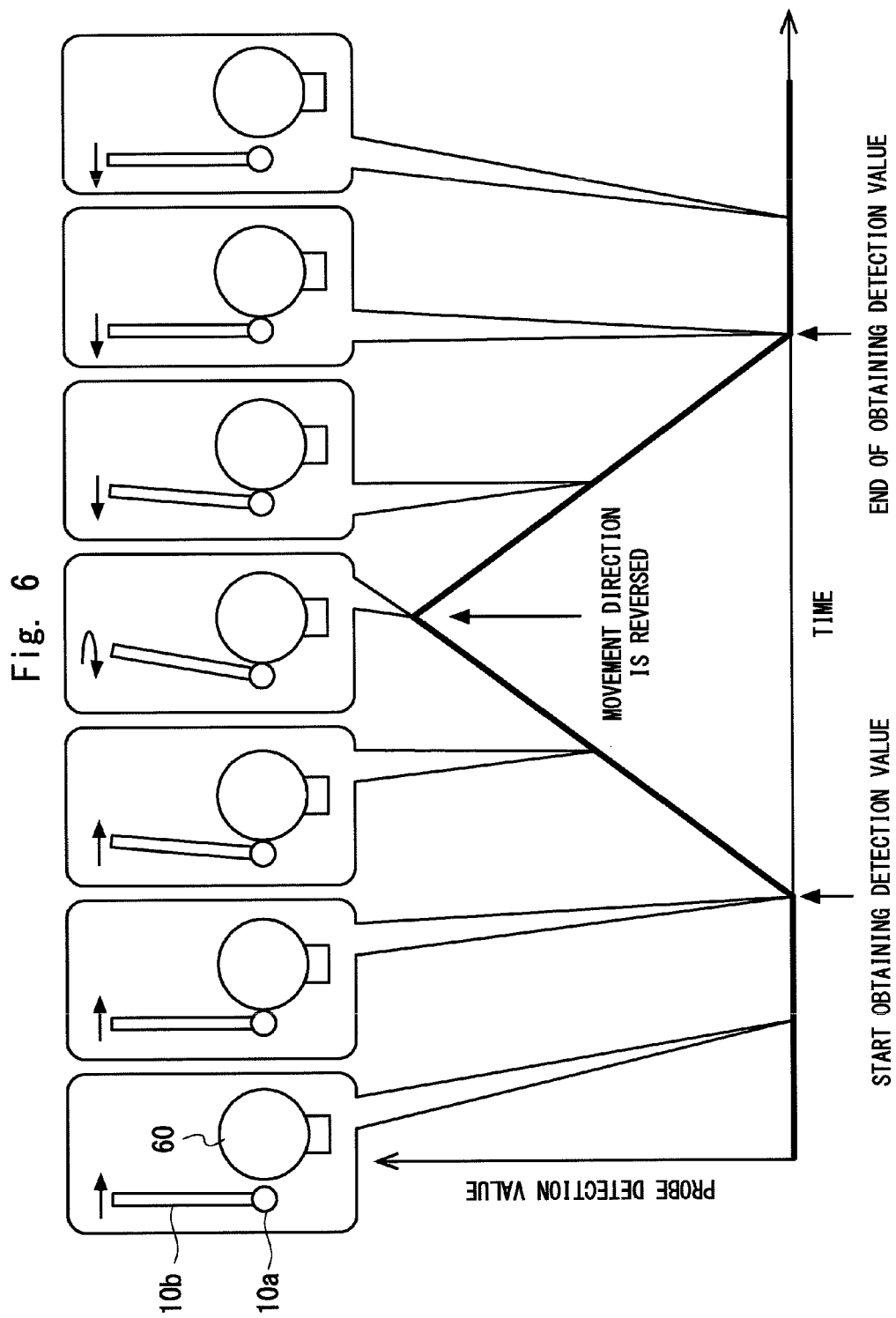
FIG. 6 is a diagram showing a state in which one-point contact measurement is executed.
Figure 7:
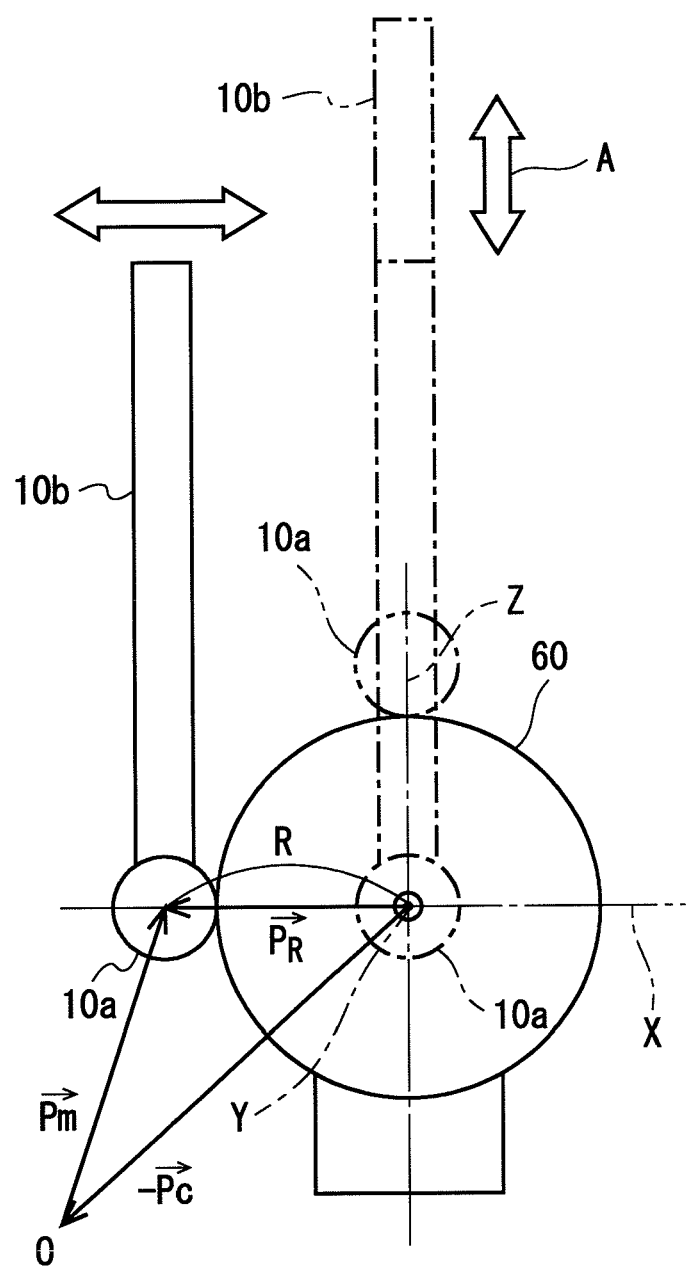
FIG. 7 is a front view showing a state in which a measurement sphere is brought into contact with the reference sphere at one point on the X-axis, the Y-axis, and the Z-axis.

As shown in FIGS. 5 to 7, the measurement sphere 10a is moved in a normal direction on a surface of the reference sphere 60 so as to bring the measurement sphere 10a of the probe 10 into contact with the surface of the reference sphere 60 at one point from the normal direction (step 22x). In this case, the measurement sphere 10a of the probe 10 is moved so as to approach the reference sphere 60 from a position proximate to the reference sphere 60. In this case, after the measurement sphere 10a is brought into contact with the reference sphere 60, the measurement sphere 10a is moved until the detection value output from the measurement tip displacement detection unit P reaches a predetermined value, and the detection values output from the measurement tip displacement detection unit P and the scale unit S are continuously obtained (step 23x).

After the detection value output from the measurement tip displacement detection unit P reaches the predetermined value, the movement of the measurement sphere 10a is reversed. After that, the measurement sphere 10a is moved in the normal direction until the measurement sphere 10a is separated from the reference sphere 60 (step 24x). Also after the movement is reversed, the detection values output from the measurement tip displacement detection unit P and the scale unit S are continuously obtained (step 25x). In other words, the detection values output from the measurement tip displacement detection unit P and the scale unit S are continuously obtained during a period between a time when the measurement sphere 10a is brought into contact with the reference sphere 60 and a time when the measurement sphere 10a is separated from the reference sphere 60.

Figure 4:
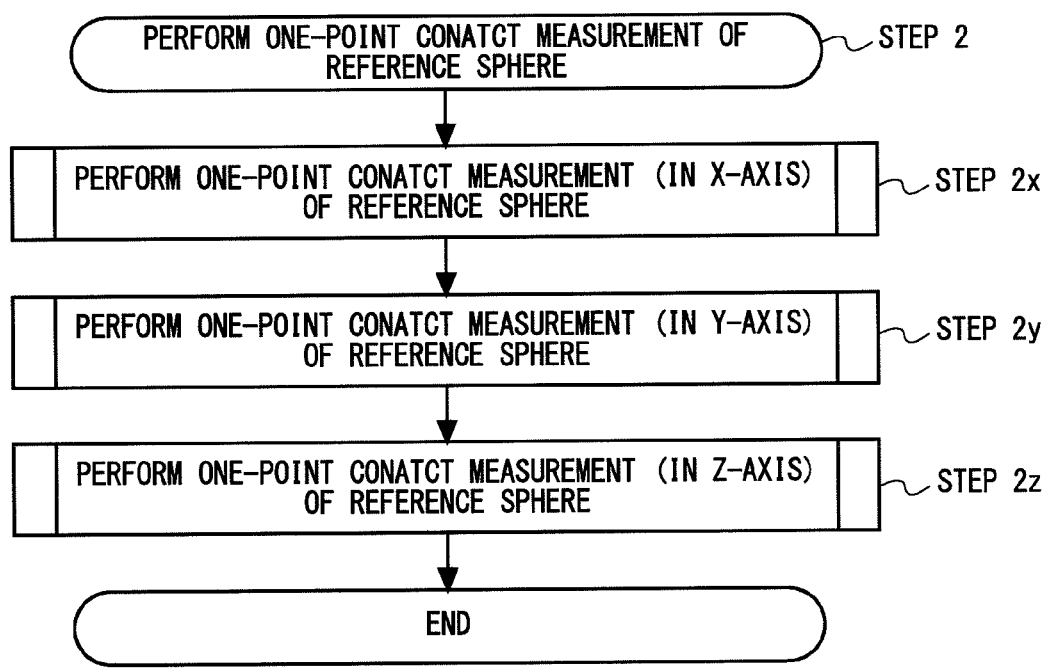
FIG. 4 is a flowchart showing one-point contact measurement of a reference sphere.

As indicated by the alternate long and short dash line in FIG. 7, the measurement sphere 10a of the probe 10 is pressed against the reference sphere 60 along the Y-axis from the normal direction, thereby executing step 2y (see FIG. 4) in the same manner as in the above-mentioned step 2x. Similarly, as indicated by the alternate long and two short dashes line in FIG. 7, the measurement sphere 10a of the probe 10 is pressed against the reference sphere 60 along the Z-axis from the normal direction (direction indicated by the arrow A) in a state in which the stylus 10b is upright, thereby executing step 2z (see FIG. 4) in the same manner as in the above-mentioned step 2y.

A process for calculating the diagonal components $A_{11}$, $A_{22}$, and $A_{33}$ of the correction matrix based on the first detection value output from the measurement tip displacement detection unit P and the second detection value output from the scale unit S will be described. This calculation process is executed by a first correction component calculation processing unit 54A (see FIG. 2).

In step 2x (steps 21x to 25x), since the coordinate measuring machine main body 2 is moved in the X-axis direction in a state in which the two axes of the probe 10 are fixed so as to prevent the measurement sphere 10a from being displaced in the Y-axis direction and the Z-axis direction, the displacement in each of the Y-axis direction and the Z-axis direction of the scale unit S and the measurement tip displacement detection unit P is "0". As for the displacement in the X-axis direction, the detection value is obtained in a state in which the measurement sphere 10a is in contact with the reference sphere 60 at one point. Accordingly, it is considered that the absolute value of the detection value output from the scale unit S in the coordinate measuring machine 1 is equal to the absolute value of the detection value which is output from the measurement tip displacement detection unit P of the probe 10 and is obtained after the coordinate conversion using the correction matrix, and that the signs of the detection values are inverted. That is, it is considered that the detection value detected by the coordinate measuring machine and the detection value detected by the probe satisfy the following Expression (4).

$$\{x_{m1}\ x_{m2}\ \ldots\ x_{mn}\} - \{x_{m1}\ x_{m1}\ \ldots\ x_{m1}\} = -A_{11}\{x_{p1}\ x_{p2}\ \ldots\ x_{pn}\} \quad (4)$$

Where $\{x_{m1}\ x_{m2}\ \ldots\ x_{mn}\}$: DETECTION VALUE OF SCALE UNIT $\{x_{p1}\ x_{p2}\ \ldots\ x_{pn}\}$: DETECTION VALUE OF MEASUREMENT TIP DISPLACEMENT DETECTION UNIT The diagonal component $A_{11}$ of the correction matrix can be easily calculated using a straight-line approximation by applying, for example, a least squares method to Expression (4).

In a similar manner, the diagonal component $A_{22}$ of the correction matrix can be easily calculated from the detection value output from the scale unit S and the detection value output from the measurement tip displacement detection unit P, which are obtained in step 2y, and the diagonal component $A_{33}$ of the correction matrix can be easily calculated from the detection value output from the scale unit S and the detection value output from the measurement tip displacement detection unit P, which are obtained in step 2z.

Next, a process for calculating the non-diagonal components $A_{12}$, $A_{13}$, $A_{21}$, $A_{23}$, $A_{31}$, and $A_{32}$ of the correction matrix based on the third detection value output from the measurement tip displacement detection unit P and the fourth detection value output from the scale unit S will be described. This calculation process is executed by a second correction component calculation processing unit 54B (see FIG. 2).

In step 4, a scanning measurement is performed using the measurement sphere 10a on the surface of the reference sphere 60 while maintaining a constant push-in amount of the measurement sphere 10a with respect to the reference sphere 60 and maintaining a constant relative distance between the center of the measurement sphere 10a of the probe 10 and the reference point (center) of the reference sphere 60.

Assuming that N sets of the detection value output from the measurement tip displacement detection unit P and the detection value output from the scale unit S are obtained by performing a scanning measurement using the reference sphere 60 with a constant push-in amount, a radial error in an i-th detection value is expressed by the following Expression (5).

$$f_i(X) = \left| \left\{ \begin{matrix} x_{mi} \\ y_{mi} \\ z_{mi} \end{matrix} \right\} + \underbrace{\begin{bmatrix} A_{11} & A_{12} & A_{13} \\ A_{21} & A_{22} & A_{23} \\ A_{31} & A_{32} & A_{33} \end{bmatrix} \left\{ \begin{matrix} x_{pi} \\ y_{pi} \\ z_{pi} \end{matrix} \right\}}_{\vec{P}_m} - \underbrace{\left\{ \begin{matrix} x_c \\ y_c \\ z_c \end{matrix} \right\}}_{\vec{P}_c} \right| - R \quad (5)$$

$$\underbrace{\phantom{xxxxxxxxxxxxxxxxxxxxxxx}}_{\vec{P}_R}$$

where $\{x_{mi}, y_{mi}, z_{mi}\}^T$: i-TH DETECTION VALUE OUTPUT FROM SCALE UNIT $\{x_{pi}, y_{pi}, z_{pi}\}^T$: i-TH DETECTION VALUE OUTPUT FROM MEASUREMENT TIP DISPLACEMENT DETECTION UNIT $\{x_c, y_c, z_c\}^T$: CENTER POSITION OF REFERENCE SPHERE

R: SUM OF MEASUREMENT SPHERE RADIUS AND REFERENCE SPHERE RADIUS $X = \{A_{12}, A_{13}, A_{21}, A_{23}, A_{31}, A_{32}, x_c, y_c, z_c, R\}^T$: UNKNOWN VARIABLE

The vectors $P_m$, $P_C$, and $P_R$ expressed in Expression (5) have a relationship as shown in FIG. 7.

The evaluation function is expressed by the following Expression (6).

$$J(X) = \sum_{i=1}^{N} f_i^2(X) \quad (6)$$

The non-diagonal components $A_{12}$, $A_{13}$, $A_{21}$, $A_{23}$, $A_{31}$, and $A_{32}$ of the correction matrix can be calculated by calculating "X" to minimize the evaluation function in Expression (6), by using, for example, a non-linear least squares method. A general solution, such as a Levenberg-Marquardt method, can be used for this calculation.

In this manner, the values of the correction matrix are obtained by the first correction component calculation processing unit 54A and the second correction component calculation processing unit 54B, and the obtained values of the correction matrix are used as correction values for a normal scanning measurement using the measurement sphere 10a.

According to the coordinate measuring machine 1 and the method for calculating the correction matrix, the diagonal components and the non-diagonal components are individually calculated by suitable calculation methods after the detection values necessary for calculation of the correction matrix are effectively obtained. This facilitates the calculation of the correction matrix, reduces the calculation time, and makes it possible to accurately calculate the probe correction matrix.

The present invention is not limited to the above exemplary embodiments and can be modified in various manners, as described below, without departing from the scope of the present invention.

While the one-point contact measurement is performed in the above-mentioned step 2 in the state in which the two axes of the probe 10 are fixed, the one-point contact measurement may be performed without fixing the axes of the probe 10. In this case, the present invention can also be applied to the case where the probe 10 has no mechanism for fixing each axis of the probe 10.

Alternatively, the one-point contact measurement may be performed by moving the measurement tip 10a in an oblique direction toward the center of the reference sphere 60 with respect to the X-axis, the Y-axis, and the Z-axis of the coordinate measuring machine 1. Furthermore, the one-point contact measurement may be performed in four or more directions.

In consideration of the effect of noise included in the probe detection value, or the detection value output from the measurement tip displacement detection unit P, the detection value output from the measurement tip displacement detection unit P and the detection value output from the scale unit S may be obtained when the probe detection value is equal to or greater than a threshold.

If the one-point contact measurement is performed without fixing the two axes of the probe, the diagonal components of the correction matrix may be calculated by calculating the correction matrix using, for example, Expression (5) disclosed in Japanese Unexamined Patent Application Publication No. 2013-15464, and only the diagonal components thus obtained may be used.

One of the measurement sphere 10a and the reference sphere 60 may be displaced, or both of them may be displaced at the same time. A spherical measurement tip is illustrated in the above exemplary embodiments, but the measurement tip may have any shape. A spherical calibration reference body is illustrated in the above exemplary embodiments, but the calibration reference body may have any shape such as a cylinder, a prism, a polygonal column, or one of such shapes having a recess formed in the center thereof.

In the case of using a sphere, the center of the sphere is used as a reference point. In the case of using a cylinder, a prism, or the like, a symmetry axis passing through the center of the shape is used as a reference axis line (reference line).

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A coordinate measuring machine comprising:
   a probe that includes a stylus having a measurement tip disposed at a distal end thereof and is configured to perform measurement by bringing the measurement tip into contact with an object to be measured;
   a measurement tip displacement detection unit that is disposed at a proximal end of the stylus of the probe and detects a displacement of the measurement tip;
   a drive unit that moves the probe in a predetermined direction;
   a scale unit that detects an amount of movement of the probe when the probe is moved by the drive unit; and
   a correction matrix calculation unit that calculates a correction matrix to correct a detection value output from the measurement tip displacement detection unit of the probe,
   wherein the correction matrix calculation unit comprises:
      a first correction component calculation processing unit that calculates diagonal components of the correction matrix based on a first detection value output from the measurement tip displacement detection unit of the probe and a second detection value output from the scale unit, the first detection value and the second detection value being obtained by a measurement in which a calibration reference body and the probe are moved relatively to each other in a normal direction on a surface of the calibration reference body so as to bring the measurement tip of the probe into contact with the surface of the calibration reference body at one point from the normal direction; and
      a second correction component calculation processing unit that calculates non-diagonal components of the correction matrix based on a third detection value output from the measurement tip displacement detection unit of the probe and a fourth detection value output from the scale unit, the third detection value and the fourth detection value being obtained by a scanning measurement using the measurement tip on the surface of the calibration reference body while maintaining a constant relative distance between the center of the measurement tip of the probe and a reference point or a reference line of the calibration reference body.

2. The coordinate measuring machine according to claim 1, wherein in the first correction component calculation processing unit, after the measurement tip of the probe is moved in the normal direction from a position proximate to the calibration reference body, the movement of the probe is reversed to move the measurement tip in the normal direction until the measurement tip is separated from the calibration reference body, and the first detection value output from the measurement tip displacement detection unit of the probe and the second detection value output from the scale unit are obtained during a period between a time when the measurement tip is brought into contact with the calibration reference body and a time when the measurement tip is separated from the calibration reference body.

3. The coordinate measuring machine according to claim 1, wherein the calibration reference body and the probe are moved relatively to each other in the normal direction so as to bring the measurement tip into contact with the surface of the calibration reference body at one point from the normal direction in a state in which the measurement tip is controlled to be displaceable only in one axis direction of a three-axis coordinate system.

4. The coordinate measuring machine according to claim 2, wherein the calibration reference body and the probe are moved relatively to each other in the normal direction so as to bring the measurement tip into contact with the surface of the calibration reference body at one point from the normal direction in a state in which the measurement tip is controlled to be displaceable only in one axis direction of a three-axis coordinate system.

5. A method for calculating a correction matrix by a coordinate measuring machine, the coordinate measuring machine comprising: a scale unit that detects an amount of movement of a probe when the probe is moved by a drive unit that moves the probe in a predetermined direction, the probe including a measurement tip displacement detection unit that detects a displacement of the measurement tip that is disposed at a stylus of the probe and is brought into contact with an object to be measured; and a correction matrix calculation unit that calculates a correction matrix to correct a detection value output from the measurement tip displacement detection unit of the probe, the method comprising:
   a one-point contact measurement step of actually measuring and obtaining a first detection value output from the measurement tip displacement detection unit of the probe and a second detection value output from the scale unit, by moving a calibration reference body and the probe relatively to each other in a normal direction on a surface of the calibration reference body so as to bring the measurement tip into contact with the surface of the calibration reference body at one point from the normal direction;

a first correction matrix calculation step of calculating diagonal components of the correction matrix based on the first detection value and the second detection value obtained in the one-point contact measurement step;

a scanning measurement step of actually measuring and obtaining a third detection value output from the measurement tip displacement detection unit of the probe and a fourth detection value output from the scale unit, by a scanning measurement using the measurement tip on the surface of the calibration reference body while maintaining a constant relative distance between the center of the measurement tip of the probe and a reference point or a reference line of the calibration reference body; and a second correction matrix calculation step of calculating non-diagonal components of the correction matrix based on the third detection value and the fourth detection value obtained in the scanning measurement step.

6. The method for calculating a correction matrix by a coordinate measuring machine according to claim 5, wherein in the one-point contact measurement step, after the measurement tip of the probe is moved in the normal direction from a position proximate to the calibration reference body until the detection value output from the measurement tip displacement detection unit of the probe reaches a predetermined value, the movement of the probe is reversed to move the measurement tip in the normal direction until the measurement tip is separated from the calibration reference body, and the first detection value output from the measurement tip displacement detection unit of the probe and the second detection value output from the scale unit are obtained during a period between a time when the measurement tip is brought into contact with the calibration reference body and a time when the measurement tip is separated from the calibration reference body.

7. The method for calculating a correction matrix by a coordinate measuring machine according to claim 5, wherein in the one-point contact measurement step, the calibration reference body and the probe are moved relatively to each other in the normal direction so as to bring the measurement tip into contact with the surface of the calibration reference body at one point from the normal direction in a state in which the measurement tip is controlled to be displaceable only in one axis direction of a three-axis coordinate system.

8. The method for calculating a correction matrix by a coordinate measuring machine according to claim 6, wherein in the one-point contact measurement step, the calibration reference body and the probe are moved relatively to each other in the normal direction so as to bring the measurement tip into contact with the surface of the calibration reference body at one point from the normal direction in a state in which the measurement tip is controlled to be displaceable only in one axis direction of a three-axis coordinate system.

* * * * *